Patented July 28, 1925.

1,547,698

UNITED STATES PATENT OFFICE.

HERMANN VIETH, OF LUDWIGSHAFEN-ON-THE-RHINE, GERMANY, ASSIGNOR TO E. BILHUBER INCORPORATED, OF NEW YORK, N. Y., A CORPORATION OF NEW YORK.

DIURETIC COMPOUND AND PROCESS OF MAKING IT.

No Drawing. Application filed February 2, 1924. Serial No. 690,300.

*To all whom it may concern:*

Be it known that I, HERMANN VIETH, a citizen of Germany, and resident of Ludwigshafen-on-the-Rhine, Germany, have invented certain new and useful Improvements in Diuretic Compounds and Processes of Making Them, of which the following is a specification.

My invention relates to medicinal compounds containing calcium or strontium. It has been found that these two metals have a beneficial action on the heart and vessels, and are distinctly preferable to barium as they are practically harmless. In view of this, increased importance has attached to the production of substances which contain said metals, together with the dimethylxanthins (which have a similar physiological action) in a form exhibiting especial medicinal efficiency.

A simple compound, for instance that of theobromin and lime (or of theobromin and a calcium salt) will probably yield good results so far as its mere action on the vessels is concerned, but conditions are not so favorable as regards its effect on the kidneys, that is, its diuretic action. In Therapeutische Monatshefte 1890, page 12, Gram has stated that theobromincalcium (which has been known for many years) is not sufficiently reliable in its diuretic action. More recent investigations concerning the diuretic effect of calcium have not yielded uniform results (see C. Röse, Münchner Medizinische Wochenschrift, 1917). As will appear from Therapeutische Halbmonatshefte, 1921, page 588, Professor Starkenstein found that the use of calcium often retards the elimination of urine. In view of these objections, I endeavored to improve the diuretic effect of the calcium constituent by the use of a special type of calcium salt the acid of which would of itself have a beneficial medicinal action.

As the result of numerous experiments, I have found that the object mentioned above can be attained by using the double salts or mixtures containing the alkaline earth salts of salicylic acid. The salicylate in this case does not act by increasing the solubility and susceptibility of resorption of the dimethylxanthin bases (as has been assumed hitherto with respect to the alkali double salts of theobromin and theophyllin, including diuretin, see, for instance, Therapeutische Monatshefte, 1890, page 19, fifth paragraph), but the diuretic effect is increased materially by the simultaneous action of dimethylxanthin, alkaline earth, and salicylic acid on the kidneys; the joint effect is far beyond the sum of the individual effects, this powerful increase being of the character corresponding to Bürgi's theory of the combined action of medicinal ingredients. This increase of the diuretic action is not found, however, in the case of double salts formed with other acids, for instance the recently produced double salt having two molecules of calcium lactate; this might have been expected from the comparative tests made by Röse, who found that, taking the average of all the series of tests, calcium lactate acted as a retardant rather than as a promoter of diuretic action (see Münchner Medizinische Wochenschrift, 1917, page 315, lines 53 to 55).

These double salts of the salicylate of calcium or of strontium are but slightly soluble in water, and will thus disturb the stomach less than readily soluble salts. The fear has been frequently expressed hitherto that this comparative lack of solubility might impair resorption in the intestinal tract, but such fear is groundless, for examination of the elimination products in the urine has demonstrated that such double salts are dissolved and resorbed in the intestines with comparative rapidity and practical completeness.

These double salts may be produced in various ways. A particularly simple method of manufacture consists in dissolving the corresponding sodium salts in water, adding a slight excess of a soluble salt of calcium or strontium, for instance the chlorid of either of these metals, and making a small addition of ammonia to the solution. By this treatment I produce the desired double salts, and not simply a mixture of the simple salts, such as, for instance, theobromincalcium and calcium salicylate; this can be ascertained by the shape of the crystals and by the character of the precipitation, as compared with the results and behavior observed when the simple salts are treated in the same manner.

Three examples of my invention are as follows:

*Example 1. — Theobromincalcium - calcium-salicylate, basic salt.*

100 grams of theobromin are dissolved in 300 cubic centimeters of an 8% solution of caustic soda, and to this I add a solution of 90 grams of sodium salicylate in 200 grams of water. To the mixture I add a solution of 110 grams of anhydrous calcium chlorid in the same amount of water, with an addition of 20 cubic centimeters of a 25% aqueous solution of ammonia. At first all ingredients will remain dissolved, but after about half an hour the entire mass will solidify into loose crystals. The mass is allowed to stand for about twelve hours (overnight), is then drawn off by suction, and the crystals are purified by washing them with water.

*Example 2.—Theophyllinstrontium-strontiumsalicylate, basic salt.*

9 grams of theophyllin and 7 grams of salicylic acid are dissolved in just the sufficient amount of a 10% solution of caustic soda. I then add a solution of 12 grams of strontium chlorid in 15 grams of water, to which an addition of 2 cubic centimeters of a 25% solution of ammonia has been made. After some time the double salt is precipitated; it is drawn off by suction, washed with water, and finally dried.

The addition of ammonia in the above examples (or of any other alkaline medium) initiates the formation of basic salicylates of the alkaline earths, containing twice as much of the respective alkaline earth as the corresponding neutral salts, and much less soluble in water than such neutral salts. Double salts may also be obtained with the neutral salicylates of the alkaline earth metals, for instance according to the following procedure:

*Example 3.—Theobromincalcium-calciumsalicylate, neutral salt.*

10 grams of theobromincalcium are finely ground with 8 grams of neutral calcium salicylate, and the resulting mass mixed with a small amount of water. The mass at first forms a thin paste which however gradually thickens and hardens. The water is then driven off by heating to a moderate temperature, and the dry substance remaining is reduced to a powder.

It will be understood that, for the purposes of my present invention, the strontium salts are equivalents of the calcium salts, and likewise theobromin and theophyllin are equivalents of each other. Furthermore, either the basic or the neutral salicylate of calcium or of strontium may be used, as referred to in connection with the above examples. Moreover, double salts of calcium dimethylxanthin (or strontium dimethylxanthin) and salicylic acid as well as mixtures of these double salts are to be understood as coming within the scope of the present invention.

The products obtained by my process exhibit the following characteristics:

They are white or slightly greyish odorless powders; scarcely soluble in water or in alcohol, not soluble in benzol, soluble in hot acids by decomposition. On heating to redness they burn without melting and leave a residue of calcium or strontium oxide. The anhydrous basic calcium double salt has the formula

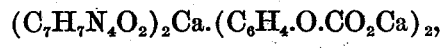

the neutral double salt

The basic calcium double salt contains 47% theobromine.

The neutral calcium double salt contains 50% theobromine.

The basic strontium double salt contains 40% theobromine.

The neutral strontium double salt contains 44% theobromine.

While in the appended claims I have named specifically double salts of calcium dimethylxanthin and salicylic acid, I desire it to be understood that double salts of strontium dimethylxanthin and salicylic acid are equivalents of such first-named double salts. Furthermore, instead of the calcium salt of theobromin mentioned in the first of the appended claims, I may use as equivalents either a strontium salt of theobromin, or either a calcium salt of theophyllin, or a strontium salt of theophyllin; and instead of salicylate of calcium mentioned in said first claim, I may use salicylate of strontium as an equivalent. I desire it to be understood that my claims are to be interpreted as covering the several equivalents mentioned in this specification.

I claim:

1. The herein described process of producing substances of high diuretic efficiency, said substances being double salts of calcium dimethylxanthin and salicylic acid, which process consists in causing a calcium salt of theobromin, to react with a like molecular amount of salicylate of calcium, to form double salts.

2. The herein described substances having strong diuretic properties, said substances being double salts of calcium dimethylxanthin and salicylic acid, such double salts containing equal molecular amounts of the individual simple salts composing them.

In testimony whereof I have signed this specification.

HERMANN VIETH.

Witnesses:
 HAZEL SOMMERHOFF,
 PAUL A. WILLIAMS.